Figure 1:
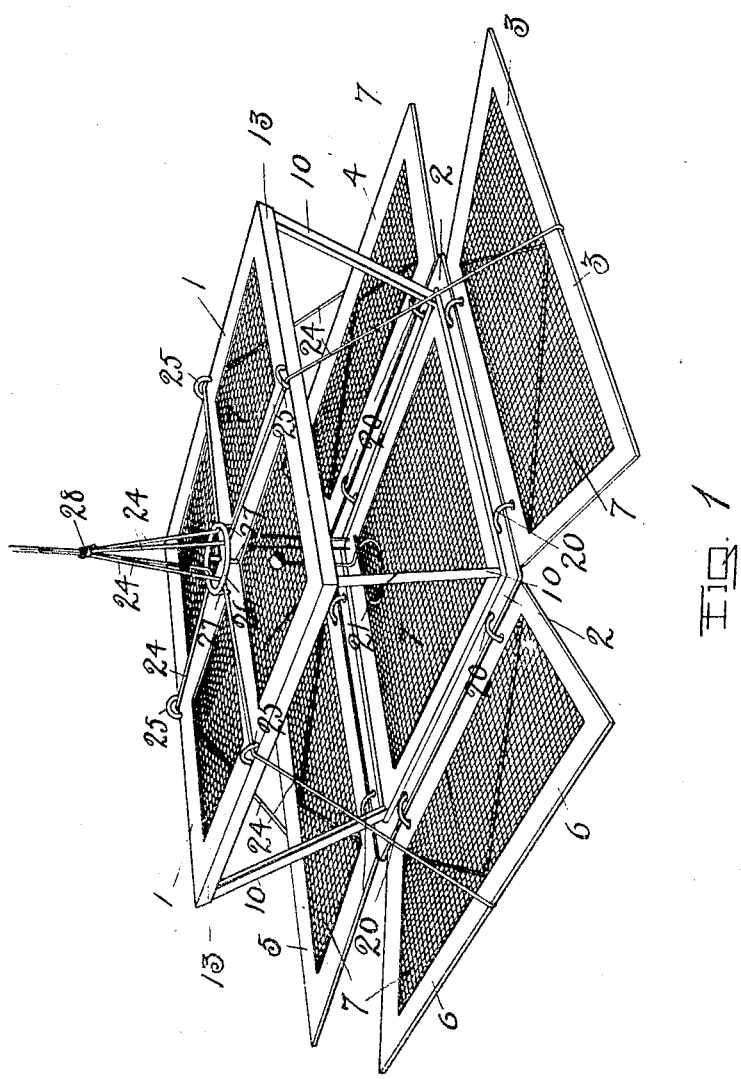

No. 885,402. PATENTED APR. 21, 1908.
J. E. THIAVILLE.
BAIT TRAP.
APPLICATION FILED SEPT. 12, 1907.

3 SHEETS—SHEET 1.

WITNESSES
E. M. O'Reilly
J. Donsbach

INVENTOR
Joseph E. Thiaville
By Mosher & Curtis
Attys

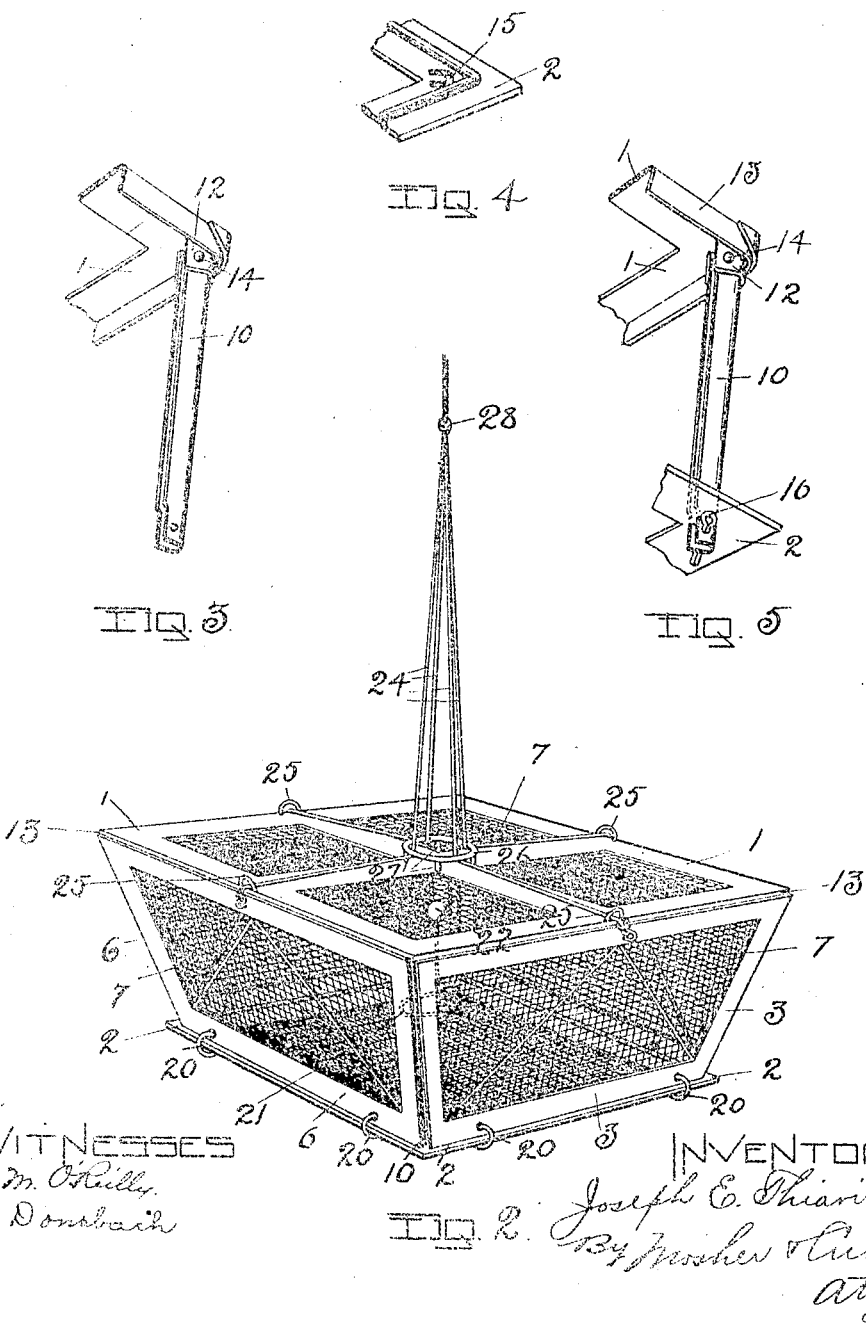

No. 885,402. PATENTED APR. 21, 1908.
J. E. THIAVILLE.
BAIT TRAP.
APPLICATION FILED SEPT. 12, 1907.

3 SHEETS—SHEET 3.

WITNESSES
E. M. O'Reilly
J. Donsbach

INVENTOR
Joseph E. Thiaville
By Mosher & Curtis
Attys

UNITED STATES PATENT OFFICE.

JOSEPH E. THIAVILLE, OF FAIR HAVEN, VERMONT, ASSIGNOR OF ONE-HALF TO WILLIAM THIAVILLE, OF UPPER TROY, NEW YORK.

BAIT-TRAP.

No. 885,402.     Specification of Letters Patent.     Patented April 21, 1908.

Application filed September 12, 1907. Serial No. 392,420.

*To all whom it may concern:*

Be it known that I, JOSEPH E. THIAVILLE, a citizen of the United States, residing at Fair Haven, county of Rutland, and State of Vermont, have invented certain new and useful Improvements in Bait-Traps, of which the following is a specification.

The invention relates to such improvements and consists of the novel construction and combination of parts hereinafter described and subsequently claimed.

Reference may be had to the accompanying drawings, and the reference characters marked thereon, which form a part of this specification.

Similar characters refer to similar parts in the several figures therein.

Figure 6:
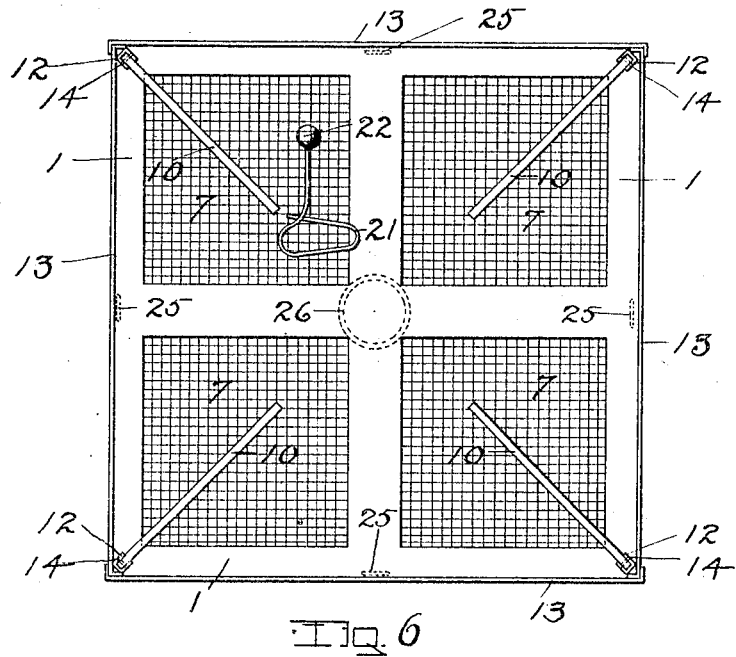
Figure 7:
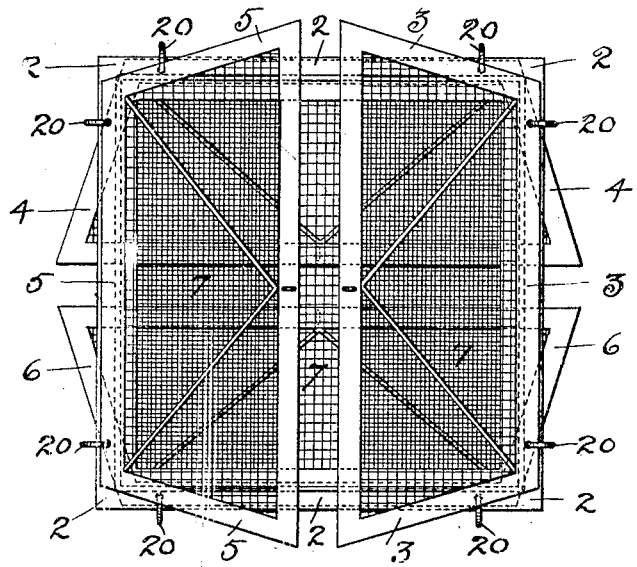

Figure 1 of the drawings is a view in perspective of the improved bait-trap "set" in position for use. Fig. 2 is a similar view of the same showing the side-frames closed in position to retain any fish which might be caught therein. Figs. 3, 4 and 5 are detail views on an enlarged scale showing corner portions of the top and bottom-frames, and means for detachably connecting the two frames. Fig. 6 is a bottom side view in plan of the top-frame detached. Fig. 7 is a plan view showing the trap collapsed and the parts folded and packed together in a convenient form for shipment.

The trap is designed to catch small fish known as bait-fish.

The trap-inclosure is formed by securing together six meshed frames comprising a top-frame, 1, a bottom-frame, 2, and side-frames 3, 4, 5 and 6. Each frame has its middle portion meshed, as by the interwoven wires, 7, as shown in the drawings. The top and bottom-frames are secured in their relative positions, shown in Figs. 1 and 2, by means of the corner-posts 10. These corner-posts are hinged at their upper ends to the top-frame as shown in Figs. 3 and 5. The ears, 12, preferably made of bent tin, are secured as by solder to the frame, 1, having a depending flange, 13, also made of tin or like material, the ears and the ends of the corner-posts being apertured to receive the hinge-pivot 14. The lower ends of the posts are projected through an aperture, 15, (see Fig. 4) formed in the corners of the bottom-frame, 2, and secured therein by a cotter-pin, 16, passed through an aperture in the lower end of the post, as seen in Fig. 5. The side-frames are hinged at their lower ends to the respective edges of the bottom-frame, as by the rings, 20, passing through apertures in the respective frames, as seen in Figs. 1 and 2.

21 is a bait-support and consists of a wire, bent as seen in Fig. 6, inserted through one of the mesh apertures in the top-frame and supported therein by means of the knob or ball, 22, secured to the upper end of the wire on the upper side of the top-frame. The bait is secured to the bent portion at the lower end of the wire which depends within the inclosure, as seen in Figs. 1 and 2.

The side-frames are adapted to swing to and fro from the position shown in Fig. 1 to that shown in Fig. 2.

As a means for swinging the frames from the position shown in Fig. 1 to that shown in Fig. 2, I provide four cords, 24, one for each side-frame. The cords are secured at their lower ends to said frames respectively. These cords pass through the guides, 25, secured to the top outer edge of the top-frame and the central ring, 26, secured to the central portion of the top-frame, as by the short posts 27. The upper ends of the cords are secured together at the desired distance from the top-frame, as by a knot 28. By lifting up on these cords the side frames will be swung upwardly to the position shown in Fig. 2.

To restore the side-frames to the horizontal position, shown in Fig. 1, it is only necessary to release the cord, 24, when the side-frames will swing down to the horizontal position by gravity. It is for the purpose of securing this latter movement through the influence of gravity that the top-frame is made larger than the bottom-frame which causes the upper edges of the side-frames to overhang their lower or hinged edges, whereby the force of gravity will cause them to open outwardly and swing to the horizontal position when the cords are released.

The operation of the device is as follows:—
The trap being deposited in a stream of water, where small fish which are used as bait-fish abound, which can be done by means of an ordinary stick or pole fastened to the upper end of the cords, 24, the cords are relaxed and the side-frames allowed to open or rest upon the ground at the bottom of the stream. The bait-support having been provided with some form of bait, as fish-worms, the small fish will enter the open trap and attack the worms. When a sufficient number has assembled about the worms, lifting force is exerted upon the cords through the pole or otherwise which first closes the side-frames to the position shown in Fig. 2. By continuing the lifting force the trap and its entrapped fish are lifted from the water and deposited upon land, the water passing out through the mesh openings in the respective frames; then the cords are released and the side-frames fall open rendering the entrapped bait fish accessible.

By having all the frames meshed, as shown, the trap will pass more readily through the water in setting the same and in removing it from the water.

To pack the trap into a small compass for shipment or carrying about from one place to another, it is only necessary to withdraw the cotter-pins, 16, from the posts and withdraw the lower ends of the posts from the bottom-frame and fold the posts down upon the inner side of the top-frame, as seen in Fig. 6, the cotter-pins being restored to their respective apertures to prevent loss. Two of the oppositely-disposed side-frames are then folded upon the upper side of the bottom-frame, and the other two side-frames are folded upon the under or opposite side of the same frame, the hinge-rings, 20, permitting the side-frames to fold upon either side of the bottom-frame. The top-frame is then placed flat upon the folded frames. The parts then occupy the relative positions, shown in Fig. 7, and form a comparatively thin compact package.

It is obvious that when desired one or more of the side-frames can be permanently secured in a closed position, and any number less than the whole can be operated in setting the trap. It is preferable, however, to operate the side-frames in pairs and one pair of oppositely-disposed frames may be permanently secured in a closed position while the other oppositely-disposed pair are opened and closed in operating the trap.

By using oppositely-disposed side-frames the pull upon the oppositely-disposed cords will balance each the other so that the two sides are closed without tipping the trap.

It is also obvious that the bait-support, 21, may be located at any desired position, preferably near the center of the trap-inclosure.

What I claim as new and desire to secure by Letters Patent is

1. In a bait-trap, of the class described, the combination with a top-frame; a bottom-frame; side-frames hinged to the edges of the bottom-frame; and guides on the top-frame; of cords secured at one end to the oscillatory edges of such hinged frames, respectively, and passed through the guides on the top-frame to the central part of such frame and secured to each other at the desired distance from the frame; and a bait-support within the trap-inclosure.

2. In a bait-trap, of the class described, having a bottom-frame and a top frame larger in area than the bottom frame; and oppositely-disposed side-walls hinged at their lower edges to the smaller frame; means whereby the opening movement of the side-frames may be controlled and whereby the closing movement of such frames may be effected; and a bait-support within the trap inclosure.

3. In a bait-trap, of the class described, the combination with the bottom frame; of a pair of oppositely-disposed side-frames hinged to swing over upon one side of such bottom frame; another pair of such side-frames oppositely-disposed and hinged to the bottom-frame to swing over upon its opposite side; and a detachable top-frame, supports for the top-frame hinged to the bottom frame to swing over upon the latter frame after the top-frame has been detached from such supports.

4. In a bait-trap of the class described, having a bottom-frame; four side-frames hinged thereto and adapted to swing over on to the same; a top-frame and detachable connections between the top and bottom-frames; closing mechanism and a bait-support secured to one of the frames.

In testimony whereof, I have hereunto set my hand this 10th day of September, 1907.

JOSEPH E. THIAVILLE.

Witnesses:
E. M. O'REILLY,
J. DORSBACH.